United States Patent [19]

Lett

[11] Patent Number: 4,821,768
[45] Date of Patent: Apr. 18, 1989

[54] TRANQUILLIZER DEVICE FOR REQULATING THE FLOW PROFILE OF FLUID

[75] Inventor: Roland Lett, Yerres, France

[73] Assignee: Schlumberger Industries, S.A., Montrouge, France

[21] Appl. No.: 589,261

[22] Filed: Mar. 13, 1984

[30] Foreign Application Priority Data

Mar. 15, 1983 [FR] France ............................ 83 04197

[51] Int. Cl.⁴ .............................................. F15D 1/02
[52] U.S. Cl. .................................... 137/551; 251/118; 138/37; 138/39
[58] Field of Search .................... 251/118, 127, 37; 137/436, 544, 545, 590, 118, 551; 138/37, 39, 40, 44, 42, 30, 43, 45, 46; 239/380, 399, 461, 553, 590; 222/547, 564

[56] References Cited

U.S. PATENT DOCUMENTS

| | | | |
|---|---|---|---|
| 1,156,432 | 10/1915 | Peavey | 138/42 |
| 1,559,344 | 10/1925 | Modlin, Jr. | 138/42 |
| 1,684,480 | 9/1928 | Evans | 138/37 |
| 1,697,528 | 1/1929 | Kahn | 138/37 |
| 1,711,270 | 4/1929 | Litle, Jr. | 138/42 |
| 1,720,246 | 7/1929 | Smith | 138/42 |
| 2,194,946 | 3/1940 | Kuntorff | 138/42 |
| 2,353,143 | 7/1944 | Bryant | 251/118 |
| 2,418,381 | 4/1947 | Wegnann | 137/545 |
| 2,618,925 | 11/1952 | Wislicenus | 138/42 |
| 2,700,989 | 2/1955 | De Benedetti et al. | 138/46 |
| 2,717,614 | 9/1955 | Palivos | 138/37 |
| 2,771,577 | 11/1956 | Gustavsson | 138/44 |
| 2,830,617 | 4/1958 | Brown | 251/118 |
| 3,068,892 | 12/1962 | Panning et al. | 251/118 |
| 3,523,557 | 8/1970 | Colter | 138/37 |
| 3,532,128 | 10/1970 | Webb | 251/118 |
| 3,720,235 | 3/1973 | Schrock | 138/46 |
| 3,730,224 | 5/1973 | Prisk | 257/118 |
| 3,733,057 | 5/1973 | Kahoun | 138/44 |
| 3,875,997 | 4/1975 | Newson et al. | 138/42 |
| 4,053,109 | 10/1977 | Gilead | 138/42 |
| 4,058,141 | 11/1977 | Hasinger et al. | 138/39 |
| 4,080,997 | 3/1978 | Biornstad | 138/39 |
| 4,135,550 | 1/1979 | Andersson | 251/118 |
| 4,245,697 | 1/1981 | Togashi | 138/42 |
| 4,458,721 | 7/1984 | Yie et al. | 138/40 |
| 4,506,860 | 3/1985 | von Schwerdtner | 251/118 |

FOREIGN PATENT DOCUMENTS

| | | |
|---|---|---|
| 576960 | 6/1959 | Canada ............................. 251/118 |
| 466752 | 5/1914 | France . |
| 238569 | 11/1945 | Switzerland . |

Primary Examiner—Albert J. Makay
Assistant Examiner—Carl D. Price
Attorney, Agent, or Firm—Dale V. Gauider

[57] ABSTRACT

A fluid flow profile regulating apparatus coaxial to a conduit carrying a fluid regulates fluid flow profile by smoothing out irregularities in fluid flow velocity transverse to the direction of flow. In one embodiment of the invention, the apparatus comprises a cylindrical chamber having a radius greater than that of the conduit and an internal set of ribs parallel to the longitudinal axis of the chamber. Each rib has a radial length less than the radius of the chamber to establish a cylindrical passage in the chamber having a radius less than that of the conduit open for uninterrupted fluid flow along the axis of the chamber. In another embodiment, although the radius of the chamber is not necessarily greater than that of the conduit, longitudinally displaced sets of internal ribs are angularly displaced with respect to each other. The longitudinally spaced, angularly offset ribs tend to cancel turbulence in the fluid developed between the ribs of the first set.

8 Claims, 1 Drawing Sheet

TRANQUILLIZER DEVICE FOR REQULATING THE FLOW PROFILE OF FLUID

BACKGROUND OF THE INVENTION

The present invention relates to devices kown as tranquillizers for use ina conduit to obtain a fluid flow having a regular speed profile.

Tranquillizers are generally mounted in conduits to regulate the flow profile of fluids upstream from a flow meter. Two types of turbulence interfere with flow meter measurements. First, flow speeds may be asymetrically distributed across a planar section perpendicular to the flow. Such asymmetry may be caused, for example, by an elbow in the conduit or by the shutter of a half-closed valve, for example a wedge gate valve. For a flow measuring device such as a Woltmann meter, this type of asymmetrical flow causes a lateral reaction onthe rotor pivot, prematurely wearing the meter as well as causing measurement errors. Another type of turbulence is vortices coaxial to the conduit. These can arise spontaneously or after the fluid has passed an obstacle. This substantially affects the meter rotor speed and hence the accuracy of flow measurements. Either type of turbulence will cause the other, so the two are typically found together. One way of dealing with such turbulences is by using, upstream of the meter, a tranquillizer having a section which flares out to a cylindrical chamber of a diameter greater than that of the conduit. This type of tranquillizer is effective against asymetrical flow distributions, but vortexes are barely attenuated.

Another solution, so-called honeycomb tranquillizers, are excellent for eliminating vortices, but have little effect on asymetrical flow distributions. The axial speed of the portion of fluid flowing through a honeycomb passage is affected relatively little. In addition, it is costly to fabricate and mount honeycomb tranquillizers in conduits.

The present invention has for an object therefore, an improved tranquillizer for regulating a fluid flow profile.

SUMMARY OF THE INVENTION

According to a first mode of the invention, the tranquillizer comprises a cylindrical chamber of a radius greater than, and mounted coaxial to, the conduit. Inside the chamber there is a set of longitudinal ribs evenly spaced around the periphery of the chamber wall and extending radially inward an appropriate distance to leave a cylindrical passage open along the axis and having a radius less than that of the conduit. Thus, the enlarged chamber corrects the flow symmetry and the fins substantially diminish vortices.

According to an other embodiment, the tranquillizer comprises a cylindrical chamber having several sets of ribs, each set extending over a fraction of the length of the chamber. The ribs of each set are offset angularly with respect to the other sets. This eliminates vortices even in the worst conditions. If, in addition, the chamber has a diameter greater than that of the conduit, assymmetrical flow profiles can be corrected.

The tranquillizers of the present invention have the advantages of being economically manufacturable and convenient to use, either separate from the meter or as part of the meter casing. They can be manufactured without special tooling and may be assembled with or without machining.

Such tranquillizers are suitable for water conduits with medium sized meters.

The invention will be better understood with reference to the following description and the accompanying drawings which represent examples, rather than limitations, of various embodiments of the invention.

DETAILED DESCRIPTION OF THE INVENTION

Figure 1:
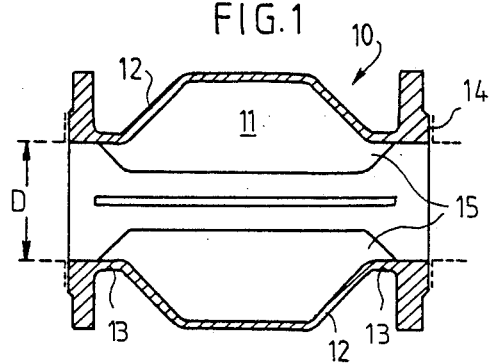
FIGS. 1 and 2 are longitudinal and axial cross sections, repectively, of a first embodiment.
Figure 2:
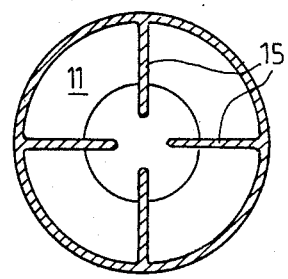

Referring to FIGS. 1 and 2, a preferred embodiment of the tranquillizer 10 comprises a cylindrical chamber 11 connected by conical sections 12 to cylindrical sections 13 and ending in flanges 14. The tranquillizer is installed in a cylindrical conduit (shown in dashed lines) having the same diameter D as sections 13.

Chamber 11, of a diameter greater than D, has an evenly spaced set of longitudinal ribs 15, extending radially inward, for example four ribs spaced 90° apart. Ribs 15 leave a cylindrical passage of a diameter less than D, for example D/2, open along the axis of the conduit.

When turbulent fluid enters the tranqullizer, the larger diameter of chamber 11 increases the pressure and decreases the speed of the fluid, which equalizes the cross-sectional distribution of its flow.

Ribs 15 inhibit vortices. Thus, the flow at the tranquillizer outlet is laminar and does not impair the operation of a downstream flow meter.

The two ends of each rib are preferably inclined with respect to the axis of the chamber.

Figure 3:
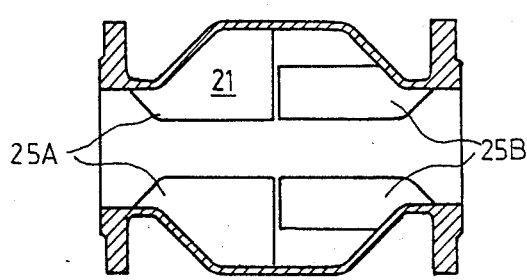
FIGS. 3 and 4 are longitudinal and axial cross sections, respectively, of a second embodiment.
Figure 4:
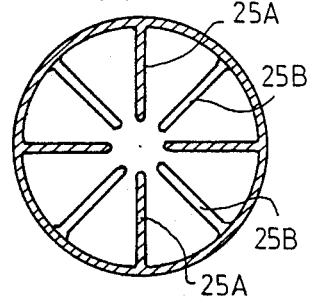

According to a second embodiment, FIGS. 3 and 4, chamber 21 has two sets of ribs 25A and 25B, each of which extends over about half the length of the chamber. The sets are angularly offset from each other so that the ribs of one set bisect the arcs between the ribs of the other set. If, for example, each set has four ribs, the sets are offset by 45°. This embodiment eliminates vortices even in the worst cases.

If there is strong vortex phenomenon at the tranquillizer entrance, partial vortexes can arise between the ribs in the first set. The second, angularly offset, set of ribs annuls these partial vortexes.

In a particular example of this embodiment, the tranqillizer has an axial length of 3 D, and the cylindrical chamber has a length of D and a diameter of 2 D. The radial dimension of the ribs is ¾ D, which leaves a central passage of diameter D/2 open.

These dimensions are only for the sake of illustration, and other proportions could be used within the bounds of the invention.

As shown in FIG. 3, the external ends of the ribs are inclined with respect to the axis of the chamber, and the internal ends of the ribs are perpendicular to said axis.

Such a tranquillizer could be mounted as a separate device upstream from a water meter or other fluid flow measuring apparatus, or it could be an integral part of the meter casing.

Figure 5:
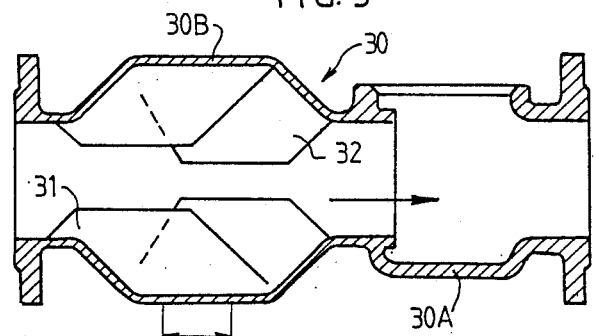
FIG. 5 is a longitudinal cross section of a third embodiment which is integrated with the casing of a water meter.

A third embodiment is represented in FIG. 5. Member 30 comprises two interdependent parts 30A and 30B. Part 30A is the meter casing and part 30b is the tranquillizer, which has two sets of ribs 31 and 32 partially overlapping in the axial direction of the chamber.

Thus the chamber includes a central zone 33 where the two sets of ribs are overlapping, and two end zones where there is just one set of ribs 31 or 32.

Figure 6:
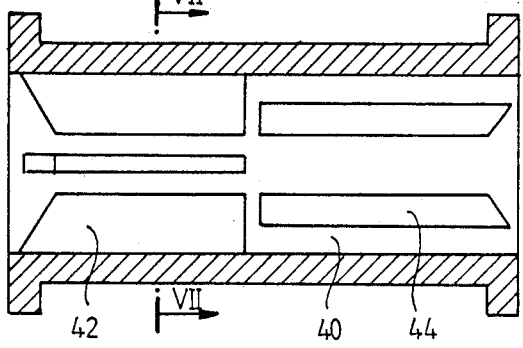
FIGS. 6 and 7 are longitudinal and axial cross sections of a fourth embodiment which is similar to the second embodiment.
Figure 7:
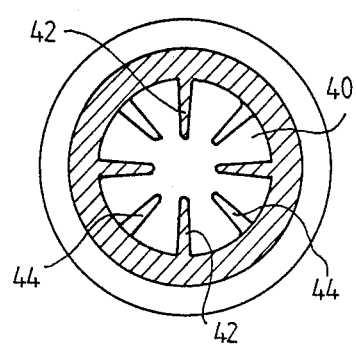

According to a fourth embodiment of the invention shown in FIGS. 6 and 7, the cylindrical chamber 40 has substantially the same diameter as the conduit. The chamber 40 is internaly provided with two sets of ribs 42 and 44. The ribs of a set are angularly spaced 90° apart. Moreover, as in the embodiments of FIGS. 3 to 5, the ribs of set 42 and the ribs of set 44 are mutually offset by 45°.

As shown in FIG. 6, the ribs of set 42 partially overlap the ribs of set 44 in the axial direction of the chamber. The overlapping parts of the ribs are preferably inclined with respect to the axis of the chamber, as are the external ends of the ribs.

This fourth embodiment of the invention is especially suitable for a the fluid flow having strong vortices, but not having significant asymmetry in the flow profile perpendicular to the flow axis.

For the tranquillizer to function effectively, it is of course necessary to mount the tranquillizer upstream of the meter.

I claim:

1. Fluid flow profile regulating apparatus for mounting coaxially in a cylindrical conduit, comprising:
   a cylindrical chamber of a radius greater than that of the conduit and having a longitudinal axis, the chamber having internally a set of longitudinal ribs oriented in planes parallel to the longitudinal axis of the chamber, said planes being evenly angularly spaced around said axis, each rib having a radial length less than the radius of the chamber extending radially inward from the chamber wall and leaving a cylindrical passage of a radius less than that of the conduit open for fluid to flow uninterrupted along the axis of the chamber.

2. Apparatus as in claim 1 further comprising several sets of ribs each extending along less than the length of the chamber, the ribs of one set being offset angularly with respect to those of another set.

3. Apparatus as in claim 2, wherein the ribs of one set partially overlap the ribs of another set along the direction of the chamber axis.

4. Apparatus as in claim 3, wherein the radius of the chamber is greater than that of the conduit, and the ribs leave open along the axis a cylindrical passage of a radius less than that of the conduit.

5. Apparatus as in claim 1 wherein the passage has a radius of approximately one-half the radius of the conduit.

6. Apparatus as in claim 1, further including a fluid flow meter casing, said casing being formed as part of said cylindrical chamber.

7. Fluid flow profile regulating apparatus for mounting in a cylindrical conduit, comprising:
   a cylindrical chamber coaxial to the conduit and having a longitudinal axis, the chamber having at least two sets of internal ribs, each extending along less than the length of the chamber and oriented in planes parallel to the longitudinal axis of the chamber, the ribs of each of set being evenly angularly spaced and extending radially inward from the periphery of the chamber, the ribs of one set being angularly offset with respect to those of another set and leaving a cylindrical passage of a radius less than that of the conduit open for fluid to flow uninterrupted along the axis of the chamber.

8. Apparatus as in claim 7 wherein the ribs of one set partially overlap the ribs of another set along the axial direction of the chamber.

* * * * *